Dec. 20, 1955    H. REHBERGER    2,727,411
SAW SWAGING TOOL
Filed Dec. 6, 1954    2 Sheets-Sheet 1
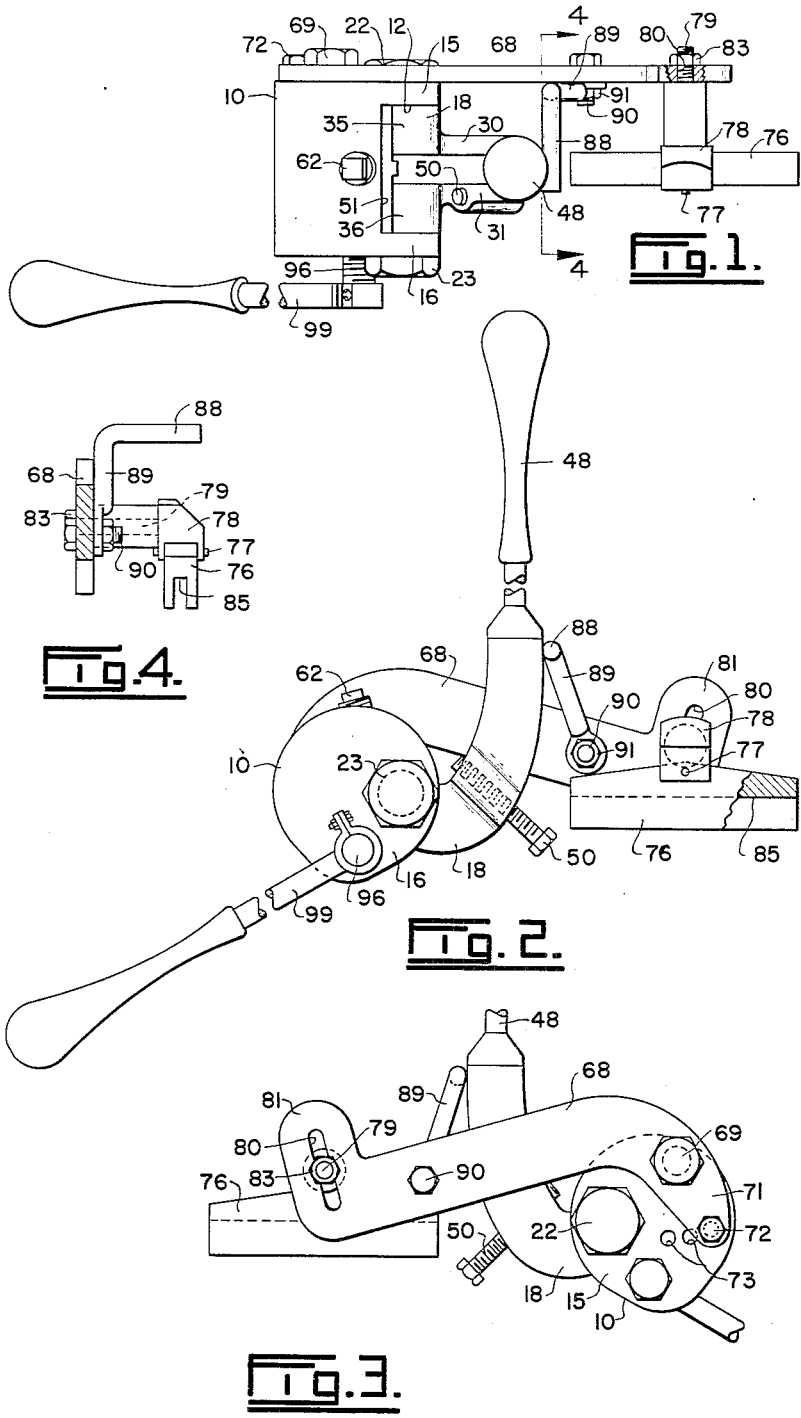
INVENTOR
HARRY REHBERGER
BY
Fetherstonhaugh & Co.
ATTORNEYS Dec. 20, 1955
H. REHBERGER
2,727,411
SAW SWAGING TOOL
Filed Dec. 6, 1954
2 Sheets-Sheet 2
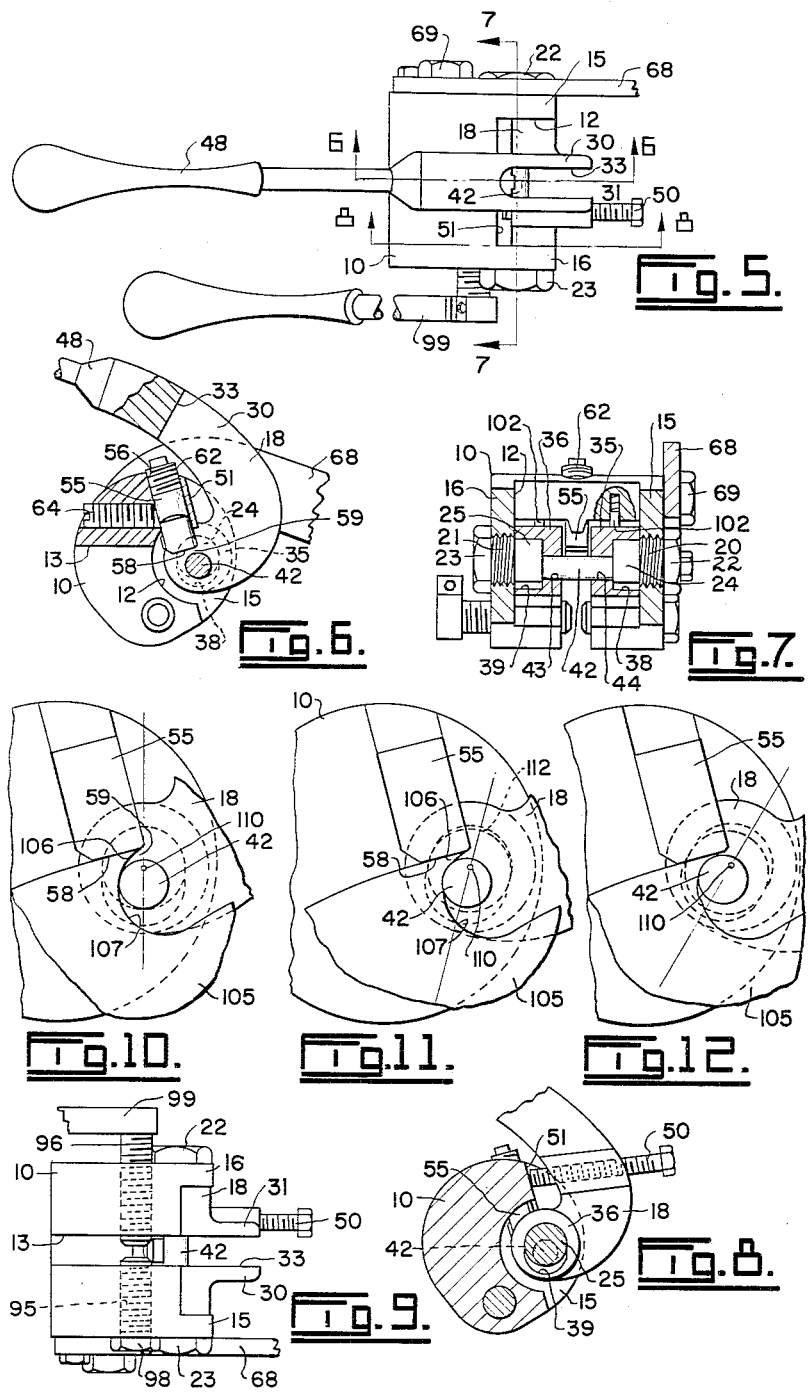
INVENTOR
HARRY REHBERGER
BY
Featherstonhaugh & Co.
ATTORNEYS

United States Patent Office 2,727,411
Patented Dec. 20, 1955

2,727,411
SAW SWAGING TOOL
Harry Rehberger, West Vancouver Township,
British Columbia, Canada
Application December 6, 1954, Serial No. 473,374
14 Claims. (Cl. 76—54)

The present invention relates to saw swaging tools, and in particular to a swaging device for the teeth of band and circular saws.

This application is a continuation-in-part of applicant's application Serial Number 388,245, filed October 26, 1953, now abandoned, as to subject matter common thereto.

These saws are provided with a series of very sharp teeth. These teeth become dull as a result of continually striking objects which are being cut, and it is necessary periodically to reshape them into sharp teeth again. This reshaping operation is known as swaging. It consists of holding the outer surface of the tooth near the tip or cutting edge thereof against a solid object called an anvil and working the metal of the tooth along its inner edge towards said tip in a forward direction to reform the tip. This direction is considered with reference to the motion of the saw during the cutting action thereof. Prior to this invention, the metal was squeezed out towards the tooth tip, but this action also squeezed some metal laterally, thereby deforming the tooth and making it necessary to grind the metal away to reform sharp corners at the sides of the tooth. The present swaging tool overcomes this difficulty by rolling out the metal towards the tip. This is much easier to do and very little or no deformation of the side corners takes place, thus reducing the amount of grinding required after the swaging operation. This reduces the amount of metal lost as a result of the swaging.

A swaging tool according to the present invention includes a die holder mounted to rotate about a fixed axis and simultaneously to move radially relative to said axis. A roller die is carried by the holder normally eccentrically of the holder axis. An anvil is so mounted relative to the roller die that when the latter is in its normal position, the tip of a saw tooth may be moved therebetween. When the holder is rotated about its axis, the die, being eccentric to said axis, is moved abruptly against and into the metal of the tooth which is bearing against the anvil. Further rotational movement of the holder causes the die to roll the metal ahead of it towards the tooth tip. During this time, the roller die is moving both around the holder axis and towards the latter. This rolling of the metal causes it to flow ahead of the die roller without spreading laterally to any great degree. Although there is considerably less wear than with a fixed die, any wear that does take place is evenly distributed around the roller die because of the rolling action thereof. The amount of effort for this rolling action is considerably less than that required when a fixed die is used since rolling friction is involved instead of sliding friction. It is well known that the coefficient of rolling friction is ordinarily considerably less than the coefficient of sliding friction. However, the main advantage lies in the fact that the metal is rolled out instead of being squeezed out, thus eliminating the necessity for heavy grinding which results in the loss of time and metal.

This swage has the further advantage that it is easily operated and is readily and quickly moved to successive saw teeth to be swaged with a minimum of trouble and physical exertion.

The invention will be more fully understood by the following detailed description of a preferred embodiment thereof taken with the attached drawings, in which, Figure 1 is a plan view of the swaging tool with the handle thereof at the end of a swaging stroke, Figure 2 is a side elevation of the tool, Figure 3 is an elevation of the side of the tool opposite that shown in Figure 2, Figure 4 is a cross section taken on the line 4—4 of Figure 1, Figure 5 is a plan view of the main portion of the tool with the handle at the starting point of a swaging stroke, Figure 6 is a fragmentary section taken substantially on the line 6—6 of Figure 5, Figure 7 is a fragmentary cross section taken on the line 7—7 of Figure 5, Figure 8 is a longitudinal section taken on the line 8—8 of Figure 5, Figure 9 is a bottom plan view of the tool as set out in Figure 5, and Figures 10, 11 and 12 diagrammatically illustrate the swaging tool on a saw blade with the roller die at the beginning, substantially half-way through, and at the end of a swaging stroke, respectively.

Referring to the drawings, 10 is a body member which may be of any desired shape. In this example, the body is in the form of a solid cylinder which is cut away centrally of the forward side thereof to form a relatively large recess 12 in line with a slot 13 which opens out through the rearward side of the body. The recess and slot forms lugs 15 and 16 on opposite sides of the body at the bottom thereof.

A die holder 18 is rotatably mounted within the recess 12 of the body 10 upon a fixed axis extending from side to side of the latter in any convenient manner. One way of doing this is to provide bolts 20 and 21 having at their outer ends heads 22 and 23, and at their inner ends axle pins 24 and 25, respectively. Bolts 20 and 21 are threaded through lugs 15 and 16, while the pins 24 and 25 extend towards each other within the recess 12 of the body, see Figure 7.

The die holder 18 is bifurcated and has downwardly extending legs 30 and 31 with a slot 33 therebetween. The legs 30 and 31 are provided with substantially circular bearing members 35 and 36 at their lower ends to one side thereof, see Figures 6 and 8. The bearing members 35 and 36 have formed in their outer surfaces short slots 38 and 39 into which the axle pins 24 and 25 respectively extend. By referring to Figure 8, it will be noted that these pins just fit nicely within these slots and that the latter are only slightly longer than the diameters of the pins. In other words, the width of each slot is substantially equal to the diameter of the pin, while its length is a little greater than said diameter. The ends of each slot may be curved to fit around the pin therein, as shown.

A roller die 42 is rotatably mounted in aligned holes 43 and 44 in the inner surfaces of the bearing members 35 and 36 of the die holder, see Figure 7. Actually, this die is freely positioned within the holes 43 and 44 which open into the slots 38 and 39 so that the die is held in position by the inner ends of pins 24 and 25. The roller die is eccentrically mounted relative to the common axis of the pins 24 and 25 which forms the axis upon which the die holder 18 rotates. The axle pins are normally positioned at one end of slots 38 and 39, and the die 42 is positioned closer to the opposite end of the slot. If the pins were to be moved to this opposite end of the slot, the roller die would be substantially concentric with said end.

The legs 30 and 31 of the die holder actually curve outwardly from the bearing members 35 and 36 thereof and back over the top of the latter when the holder is in its normal position at the beginning of a swaging stroke. A relatively long operating handle 48 is secured to the outer end of the die holder and lies in an inclined plane when the holder is in its normal position. A set screw 50 is threaded in the leg 18 of the die holder and is adapted to abut against a flat face 51 formed on the body 10 in the recess 12 thereof. When the handle and die holder are in the normal position, the slots 38 and 39 extend substantially straight up and down, as shown in Figures 6 and 10.

An anvil 55 is provided in the swage body normally spaced a little from the roller die 42 in the path of movement thereof. The anvil fits in a substantially vertical bore 56 in the body 10 midway between the opposite sides thereof, said anvil projecting downwardly into the slot 33 in the die holder between the bearing members 35 and 36 thereof, see Figure 6. This anvil has a flat lower end 58 which is spaced a little from the die 42 when the latter is in its normal position, thus forming a space or gap 59 therebetween into which the tip of a saw tooth may be moved. The anvil is retained in position by a plug 62 threaded into the upper end of bore 56. A set screw 64 is threaded into the body 10 substantially at right angles to the bore, the inner end of said screw bearing against the anvil firmly to retain it in position. The anvil may be adjusted vertically to any desired position when the set screw is loose, and then the latter is turned to fix the anvil in the adjusted position.

By referring to Figure 6 it will be seen that the lower end of the anvil is to one side of and above the roller die 42 and in the path of movement thereof. When the operating handle 48 and, consequently, the die holder 18, are rocked forwardly, the die moves about the axis of rotation of the holder towards the anvil.

Suitable guide means is provided for retaining the swaging tool upright on a saw blade and to help guide the tool along the blade. This may be in the form of an arm 68 mounted on a suitable pivot, such as a bolt 69, threaded into the side of the body 10. This arm has an extension 71 extending rearwardly and downwardly therefrom having a set screw 72 at its outer end adapted to be screwed into any one of a plurality of spaced tapped holes 73 in the tool body, see Figure 3, said holes being arranged on an arc, the centre of which coincides with the axis of bolt 69 around which arm 68 pivots. This enables the arm to be set in different positions and retained therein by set screw 72.

An elongated guide 76 is pivotally mounted on a pin 77 carried by a bracket 78, said bracket having a laterally projecting bolt 79 extending through a vertical slot 80 in a projection 81 extending upwardly from the outer end of arm 68. A nut 83 is threaded on to this bolt to hold the bracket in any desired position in the slot. This enables the guide 76 to be adjusted vertically relative to the arm. This guide has a vertical slot 85 extending longitudinally thereof opening outwardly from its opposite ends and from its lower edge, see Figures 2 and 4. The guide is adapted to rest on the edge of a saw blade, and the slot thereof is in line with the slot 13 of the body 10 and slot 33 of the die holder.

A suitable stop is provided for the operating handle 48. In this example, a stop bar 88 extends across the path of forward movement of the operating handle, said bar being held in position by a support 89 freely mounted at its lower end on a horizontal bolt 90, said bolt extending through the arm 68. This support is clamped against the arm in any adjusted position by a nut 91.

Suitable means is provided for clamping the body 10 on the edge of a saw blade, or on a tooth thereof. This may be in the form of aligned bolts 95 and 96, see Figure 9, which are threaded through the body 10 near the bottom thereof and extend towards each other in its slot 13. Bolt 95 has a head 98 on its outer end, while bolt 96 has a clamping arm 99 fixably secured to its outer end. Handle 99 tends to hang downwardly and rearwardly of the swage body, see Figure 2. When this handle is swung upwardly and forwardly, the bolt 96 connected thereto moves towards bolt 95, and when the handle is moved in the opposite direction, the former bolt moves away from the latter bolt.

As the slots 38 and 39 in the sides of the die holder 18 normally extend up and down, the axle pins 24 and 25 are normally positioned at the upper ends thereof. In other words, the die holder hangs on these pins. However, in order to be sure that the roller die 42 is normally spaced from the lower end of anvil 55 to provide the gap 59 therebetween, it may be desirable to provide a pair of spring-loaded plungers 102 extending downwardly from the body 10 and pressing against the bearing members 35 and 36 of the die holder, see Figure 7. This presses said members downwardly.

Figures 10 to 12 illustrate the swaging tool on a saw tooth 105 which has a cutting tip 106 thereon. The forward edge 107 of the tooth curves rearwardly and inwardly of the tip 106, as clearly shown in the drawings.

When the swaging tool is placed on the edge of a saw, the roller die 42 thereof usually engages the back of a saw tooth, e. g. tooth 105. The tool is moved forwardly until the die moves off the tip of the tooth and drops downwardly. This brings the lower end of anvil 55 against the back of the tooth over the tip thereof. The tool is moved rearwardly until the tooth tip 106 moves into the gap 59 between the die and the anvil, as clearly shown in Figure 10. At this time the roller die bears against the forward edge 107 of the saw tooth immediately below the tip thereof. In Figures 10 to 12, the axis of rotation of the die holder 18 is illustrated at 110. It will be seen that the die 42 is mounted eccentrically relative to this axis and more or less hangs downwardly therefrom. When the operating handle 48 is moved forwardly, the die holder rocks about the axis 110 and this moves the die laterally with a slight upward movement against the metal of the saw tooth. As the back of the tooth is bearing against anvil 55, the tip of the tooth cannot move so that the die is pressed into the metal of the forward edge beneath the tip, as clearly illustrated in Figure 10. The axle pins act as a fulcrum for the lever formed by the operating handle and the die holder. As most of the movement of the die at this time is in a lateral direction, it moves comparatively quickly into the metal. While this action was taking place, the slots 38 and 39 of the die holder were also tipping about the axis 110. As the metal of the tooth resists the movement of the roller die, and the upper ends of the holder slots have tipped forwardly, the holder tends to ride upwardly slightly on the axle pins 24 and 25 radially relative to its axis of rotation, the amount of movement being shown at 112 in Figure 11. Further movement of the operating handle swings the die holder forwardly and at the same time tips the slots thereof further in the same direction. At this time, the die holder tends to move radially mainly upwardly and forwardly on the axle pins rather than swing around its own axis. This causes the die 42 to roll forwardly towards the cutting edge of the saw tip 106. This action rolls the metal forwardly towards the cutting edge and, at the same time, presses it out to a fairly fine edge, as shown in Figure 11. The stop bar 88 limits the movement of the operating handle, and this determines the thickness of metal left at the tooth tip. The roller die is usually prevented from coming into contact with the anvil so that the metal will not be too thin at the cutting tip. When the metal is too thin at this point, there is a greater tendency for the tip to break off or become dull when the saw is in use than would otherwise be the case. As the axle pins are almost at the lower end of the die holder slots when the swaging operation is completed, the roller die is almost concentric with said ends at this time.

From the above it will be seen that during the swaging operation, the roller die is first sharply pressed into the metal of the saw tooth being swaged. Then the roller is drawn towards the tip of the tooth to roll the metal ahead of it in the direction of said tip. There is, of course, at this time, a very slight amount of movement towards the anvil around the axis 15. By rolling the metal in this manner, most of it flows ahead of the roller towards the tip which is a desirable thing. Thus, very little of the metal is pressed out laterally of the tooth to deform the side edges thereof. As a result of this, very little or no grinding is required to restore the side edges of the tooth, and very little grinding is required at the actual tip to provide the necessary cutting edge thereon. Not only does this result in the saving of metal, but the swaging action is much easier than with prior swages because the metal is rolled out and not squeezed out as has been the case heretofore.

The guide 76 helps to steady the body 10 on the saw blade, and it may be adjusted up or down to fit saws of different sizes, and the arm 68 may be shifted up or down to enable the swage to be applied to a straight or circular saw.

What I claim as my invention is:

1. In a swaging tool, a die holder mounted to rotate about a fixed axis and simultaneously to move radially relative to said axis, a roller die carried by the holder extending parallel to said axis and normally positioned eccentrically of the latter, and an anvil normally spaced a little from the roller die in the path of movement of said die, whereby rotation of the die holder first moves the roller die into the metal of a saw tooth tip placed between it and the anvil with its top extending substantially in the direction of movement of the die and then causes the die to roll the metal towards said tip as the die moves around and in the direction of the holder axis.

2. In a swaging tool, a die holder mounted to rotate about a fixed horizontal axis and simultaneously to move upwardly towards said axis, a horizontal roller die carried by the holder normally positioned below and eccentrically of the latter, and an anvil normally spaced a little from the roller die to one side and above said die in the path of movement thereof, whereby rotation of the die holder first moves the roller die laterally and upwardly into the metal of a saw tooth top placed between it and the anvil with its tip extending substantially in the direction of movement of the die and then causes said die to roll the metal towards said tip as the die moves around and in the direction of the holder axis.

3. In a swaging tool, a bifurcated die holder having spaced parallel legs, aligned short slots in the outer sides of the legs, opposed pins projecting into the two slots and normally positioned at one end thereof, said pins forming an axis around which the holder may be rotated, a roller die rotatably carried by and extending across the slot between the holder legs eccentric to said axis and near the end of the slots remote from the pins, and an anvil normally spaced a little from the roller die in the path of movement of said die, the space between the anvil and die being large enough to receive a saw tooth tip extending substantially in the direction of movement of the die, whereby rotation of the holder around the pins moves the roller die into the metal of the tooth and further rotation causes the holder to shift along its slots on the pins to roll the die along the tooth towards the tip thereof.

4. A swaging tool as claimed in claim 3 including means for adjusting the size of the space between the anvil and the roller die.

5. In a swaging tool, a body member having spaced lugs projecting downwardly at opposite sides thereof, means for clamping the tooth edge of a saw blade between the lugs, a die holder having outwardly-extending spaced legs at one end extending between the lugs, an operating handle projecting from the opposite end of the holder, means carried by the body lugs for supporting the die holder spaced from the ends of its legs to permit rotation and radial movement of the holder, a roller die extending between and journalled in the holder legs eccentrically of the supporting means of the holder, and an anvil in the body member extending towards the roller die and in the path of movement thereof.

6. In a swaging tool, a body member having spaced lugs projecting downwardly at opposite sides thereof, means for clamping the tooth edge of a saw blade between the lugs, a die holder having outwardly-extending spaced legs at one end extending between the lugs, an operating handle projecting from the opposite end of the holder, opposed short slots in opposite sides of the holder, axle pins extending into the space between the lugs from opposite sides thereof and into the holder slots to support the holder and permit rotation and radial movement thereof, a roller die extending between and journalled in the holder legs eccentrically of the axle pins, and an anvil in the body member extending towards the roller die and in the path of movement thereof.

7. A swaging tool as claimed in claim 6 in which the axle pins are carried by aligned bolts threaded through the body lugs.

8. A swaging tool as claimed in claim 6 in which the anvil is adjustable towards and away from the roller die, and including means for retaining the anvil in any adjusted position.

9. A swaging tool as claimed in claim 6 including stops for adjusting the limits of movement of the handle back and forth about the axle pins.

10. A swaging tool as claimed in claim 6 in which means for clamping the saw between the body lugs comprises a bolt threaded through one of the lugs and extending into the space between it and the other lug, and a handle on the outer end of the bolt by means of which the latter may be rotated.

11. A swaging tool as claimed in claim 10 including another bolt threaded through the other lug in line with the clamping bolt.

12. In a swaging tool, a body member having spaced lugs projecting downwardly at opposite sides thereof, means for clamping the tooth edge of a saw blade between the lugs, a die holder having outwardly-extending spaced legs at one end extending between the lugs, an operating handle projecting from the opposite end of the holder, opposed short slots in opposite sides of the holder, axle pins extending into the space between the lugs from opposite sides thereof and into the holder slots to support the holder and permit rotation and radial movement thereof, aligned holes in the legs opening into the slots opposite the axle pins in the latter, said holes being eccentric of the common axis of the pins, a roller die rotatably mounted in said holes retained therein by the pins, and an anvil in the body member extending towards the roller die and in the path of movement thereof.

13. A swaging tool as claimed in claim 12 in which the holder slots normally extend up and down, and including means carried by the body member for pressing the die holder downwardly normally to keep the axle pins at the upper ends of said slots.

14. In a swaging tool, a body member having spaced lugs projecting downwardly at opposite sides thereof, means for clamping the tooth edge of a saw blade between the lugs, a die holder having outwardly-extending spaced legs at one end extending between the lugs, an operating handle projecting from the opposite end of the holder, means carried by the body lugs for supporting the die holder spaced from the ends of its legs to permit rotation and radial movement of the holder, a roller die extending between and journalled in the holder legs eccentrically of the supporting means of the holder, an anvil in the body member extending towards the roller die and in the path of movement thereof, an arm pivotally mounted near one end on the body member and extending forwardly thereof, means for retaining the arm in different positions relative to the body member, and a guide adjustably mounted on the outer end of the arm in line with the space between the body lugs.

No references cited.